United States Patent
Hantschel et al.

(10) Patent No.: US 11,112,427 B2
(45) Date of Patent: Sep. 7, 2021

(54) METHOD AND TIP SUBSTRATE FOR SCANNING PROBE MICROSCOPY

(71) Applicant: IMEC VZW, Leuven (BE)

(72) Inventors: Thomas Hantschel, Houtvenne (BE); Hugo Bender, Edegem (BE); Kristof Paredis, Oud-Heverlee (BE); Antti Kanniainen, Leuven (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 17/069,228

(22) Filed: Oct. 13, 2020

(65) Prior Publication Data
US 2021/0116476 A1    Apr. 22, 2021

(30) Foreign Application Priority Data
Oct. 17, 2019  (EP) .................................. 19203758

(51) Int. Cl.
| G01Q 70/10 | (2010.01) |
| G01Q 70/14 | (2010.01) |
| G01Q 60/30 | (2010.01) |

(52) U.S. Cl.
CPC ............. *G01Q 70/10* (2013.01); *G01Q 70/14* (2013.01); *G01Q 60/30* (2013.01)

(58) Field of Classification Search
CPC ......... G01Q 70/10; G01Q 70/14; G01Q 60/30
USPC ......... 850/52, 53, 55, 56, 57, 58, 59, 60, 61
See application file for complete search history.

(56) References Cited

U.S. PATENT DOCUMENTS

| 5,036,490 A | 6/1991 | Kajimura et al. |
| 5,221,415 A | 6/1993 | Albrecht et al. |
| 5,540,958 A | 7/1996 | Bothra et al. |
| 5,992,226 A | 11/1999 | Green et al. |
| 6,756,584 B2 | 6/2004 | Hantschel et al. |

(Continued)

FOREIGN PATENT DOCUMENTS

| EP | 0381113 A2 | 8/1990 |
| EP | 1990626 A1 | 11/2008 |

(Continued)

OTHER PUBLICATIONS

Green et al. ("Microfabricated tip arrays for improving force measurements", Applied Physics Letters vol. 74, No. 10, Mar. 8, 1999, pp. 1489-1491).*

(Continued)

*Primary Examiner* — Nicole M Ippolito
(74) *Attorney, Agent, or Firm* — McDonnell Boehnen Hulbert & Berghoff LLP (57) ABSTRACT

The disclosure is related to a method for performing SPM measurements, wherein a sample is attached to a cantilever and scanned across a tip. The tip is one of several tips present on a substrate comprising at least two different types of tips on its surface, thereby enabling performance of multiple SPM measurements requiring a different type of tip, without replacing the cantilever. The at least two different types of tips are different in terms of their material, in terms of their shape or size, and/or in terms of the presence or the type of active or passive components mounted on or incorporated in the substrate, and associated to tips of one or more of the different types. The disclosure is equally related to a substrate comprising a plurality of tips suitable for use in the method of the disclosure.

13 Claims, 6 Drawing Sheets

(56) References Cited

U.S. PATENT DOCUMENTS

| | | | | |
|---|---|---|---|---|
| 2003/0020500 A1* | 1/2003 | Altmann | ............... | G01Q 40/00 850/19 |
| 2009/0038383 A1* | 2/2009 | Nakaue | ..................... | G03F 1/72 73/105 |
| 2011/0277193 A1* | 11/2011 | Smetana | ............... | G03F 7/0002 850/56 |
| 2017/0003336 A1* | 1/2017 | Ippolito | ............. | G01R 31/2898 |
| 2017/0292923 A1 | 10/2017 | Baralia et al. | | |

FOREIGN PATENT DOCUMENTS

| | | |
|---|---|---|
| EP | 2869071 A1 | 5/2015 |
| WO | 2016205257 A1 | 12/2016 |
| WO | 2017149024 A1 | 9/2017 |

OTHER PUBLICATIONS

Extended European Search Report and Written Opinion, EP Application No. 19203758.8, dated Apr. 1, 2020, 8 pages.

Green, John-Bruce D., Alexey Novoradovsky, Doewon Park, and Gil U. Lee. "Microfabricated tip arrays for improving force measurements." Applied physics letters 74, No. 10 (1999): 1489-1491.

Kondoh, You, Judith Seeger, and Paul Merchant. "Fabrication of nanoscale tungsten tip arrays for scanning probe microscopy-based devices." Journal of microelectromechanical systems 7, No. 4 (1998): 428-434.

Won, Soonho, Seung-Bo Saun, Soonchil Lee, SangGap Lee, Kiwoong Kim, and Yunseok Han. "NMR spectroscopy for thin films by magnetic resonance force microscopy." Scientific reports 3, No. 1 (2013): 1-4.

Mamin, H. J., M. Poggio, C. L. Degen, and D. Rugar. "Nuclear magnetic resonance imaging with 90-nm resolution." Nature nanotechnology 2, No. 5 (2007): 301-306.

Van Bentum, P. J. M., J. W. G. Janssen, and A. P. M. Kentgens. "Towards nuclear magnetic resonance µ-spectroscopy and µ-imaging." Analyst 129, No. 9 (2004): 793-803.

\* cited by examiner

METHOD AND TIP SUBSTRATE FOR SCANNING PROBE MICROSCOPY

CROSS-REFERENCE TO RELATED APPLICATIONS

The present application is a non-provisional patent application claiming priority to European Patent Application No. 19203758.8, filed Oct. 17, 2019, the contents of which are hereby incorporated by reference.

FIELD OF THE DISCLOSURE

The present disclosure is related to methods and tools for performing scanning probe microscopy (SPM) measurements. SPM is the general term for a number of material characterization and imaging techniques, such as atomic force microscopy (AFM) or scanning spreading resistance microscopy (SSRM).

BACKGROUND

Most SPM measurements utilize a probe that is scanned relative to a material sample. The probe comprises an elongate strip attached at one end to a holder and carrying at its other end a tip. The strip is referred to as the cantilever of the probe, while the tip may be a pyramid-shaped body attached to the plane of the cantilever as illustrated for example in U.S. Pat. No. 5,221,415. During an SPM acquisition, the tip is placed in contact to or in close proximity with a surface of the sample and the probe is scanned along a given trajectory, usually a set of parallel lines. The interaction between the tip and the surface is translated into topographical, electrical, or magnetic data of the surface, or into signals related to the composition of a sample, depending on the characteristics of the tip and the measurement setup. The probe may be in continuous contact with the surface under investigation, or an intermittent contact mode may be applied, wherein the surface characteristics are measured by detecting changes in the impedance (electrical or other) of the probe-surface connection. A contactless mode is equally applicable, when the interaction between the probe and the surface is dominated by non-contact forces such as Van der Waals forces.

The range of SPM techniques has thus become substantial. The term atomic force microscopy includes variants such as electrostatic force microscopy (EFM), magnetic force microscopy (MFM), or Kelvin probe force microscopy (KPFM), whereas scanning spreading resistance microscopy (SSRM), scanning tunneling microscopy (STM), and magnetic resonance force microscopy (MRFM) have been developed as separate SPM domains. The probe tips suitable for different SPM techniques may have specific characteristics in terms of their shape, dimensions and material, as a function of the technique's requirements. For example in SSRM, a biased doped diamond tip is scanned over the sample surface while measuring the local spreading resistance underneath the tip. Doped diamond is needed as a tip material in order to withstand GPa pressure in SSRM at which the so-called beta-tin phase is formed (for Si at about 8-12 GPa) which has a metal-like behaviour and results in a good electrical contact. Diamond tips are also used in other AFM techniques, due to their high resistance to wear. However a sharper or a less sharp or a more or less robust tip may be required depending on the specific AFM variant that is being applied. For MFM, tips generally comprise at least an outer surface formed of a magnetic material.

Today, when different types of SPM measurements are performed on the same sample, this can require the exchanging of one type of probe for another, which is often a complex and time-consuming effort, both in terms of actually replacing the probe and in terms of relocating the region of interest on the sample.

A particular technique that has been developed in recent years is the slice-and-view based SPM tomography, also known as the scalpel technique. This entails the alternate application of an ultra-high force scan for removing a layer of material of a sample, followed by a lower-force scan for measuring a given property, for example by SSRM. The repeated performance of this sequence then allows obtaining a 3D tomographic image of specific characteristics of a sample. Today the scalpel technique uses the same (e.g., diamond) probe tip for both operations, which is however not ideal, as the slicing step quickly deteriorates the tip, leading to a decline in the image quality obtained from the lower-force scanning step.

For performing magnetic resonance force microscopy (MRFM), it is known to apply a 'reverse setup', namely to attach a sample to a cantilever and scan it with respect to a tip or a substrate comprising several tips of the same type. This is illustrated for example in document "Nuclear magnetic resonance imaging with 90 nm-resolution", H. J. Mamin et al, Nature nanotechnology, Vol. 2, May 2007, published online 22 Apr. 2007, doi:10.1038/nnano.2007.105. The document is related to MRFM, which is quite distinct from other SPM measurements because of the vertical position of the cantilever in MRFM, compared to a horizontal or slightly tilted position of the probe for most other SPM types.

SUMMARY

The disclosure is related to a method for performing SPM measurements, wherein a sample is attached to a cantilever and scanned across a tip. The tip is one of several tips present on a substrate comprising at least two different types of tips on its surface, thereby enabling performance of multiple SPM measurements requiring a different type of tip without replacing the cantilever. The at least two different types of tips are different in terms of their material, in terms of their shape or size, and/or in terms of the presence or the type of active or passive components mounted on or incorporated in the substrate, and associated to tips of one or more of the different types. The disclosure is equally related to a substrate comprising a plurality of tips suitable for use in the method of the disclosure.

The disclosure is in particular related to a method for performing a scanning probe microscopy (SPM) measurement on a sample, comprising the steps of:

Attaching the sample to a cantilever;

Providing a substrate comprising on its surface a plurality of SPM tips comprising at least two types of SPM tips which differ from each other in terms of their material, in terms of their shape or size, and/or in terms of the presence or the type of active or passive components mounted on or incorporated in the substrate, and associated to tips of one or more of the different types;

Performing one or more first SPM measurements by scanning the sample across a tip of a first type;

Performing one or more second SPM measurements by scanning the sample across a tip of the second type; and Possibly performing one or more further SPM measurements by scanning the sample across a tip of other types.

According to an embodiment, the cantilever is held parallel or in a tilted position at a sharp angle relative to the surface of the substrate.

According to an embodiment, the cantilever is held in the tilted position relative to the surface of the substrate and the sample is a solid volume shaped so that the surface of the sample that is in contact with or in close proximity to the tips and is essentially parallel to the tip substrate.

According to an embodiment, a tilted surface is provided on the side of the cantilever opposite the sample, and wherein the SPM measurements are performed in an apparatus that requires a given tilted position of the cantilever at a sharp angle relative to the surface of substrate, but wherein the tilted surface allows maintaining the cantilever as a whole parallel to the surface of the substrate or at an angle smaller than the required angle.

According to an embodiment, a sequence of steps is performed, comprising a first step of slicing away a layer from the surface of the sample by scanning the sample across one of the tips of the first type, and a second step of performing an SPM measurement by scanning the sample across one of the tips of the second type, and wherein the sequence is repeated multiple times to thereby obtain a tomographic image of one or more characteristics of the sample. According to an embodiment, the slicing steps and the SPM steps are performed while the tips applied in these steps are enveloped by a liquid, such as an oil. The liquid may be applied in the form of a droplet of the liquid enveloping multiple tips of different types, or in the form of individual droplets enveloping individual tips or groups of tips.

According to an embodiment, the sample is attached to the cantilever and furthermore encapsulated by a supporting material.

The disclosure is equally related to a substrate comprising on its surface a plurality of SPM tips, comprising at least two types of SPM tips which differ from each other in terms of their material, in terms of their shape or size, and/or in terms of the presence or the type of active or passive components mounted on or incorporated in the substrate, and associated to tips of one or more of the different types.

According to an embodiment of the substrate of the disclosure, the active or passive components comprise electrical components to which the tips of one or both of the types are electrically connected.

According to an embodiment of the substrate of the disclosure, the active or passive components comprise liquid channels.

According to an embodiment of the substrate of the disclosure, the tips are arranged in a regular array on the surface of the tip substrate.

According to an embodiment of the substrate of the disclosure, the tips are pyramid-shaped.

According to an embodiment of the substrate of the disclosure, the tips are formed as nano-sized cones or pillars.

According to an embodiment of the substrate of the disclosure, the tips are provided with identifying codes on the substrate, in proximity of the respective tips, for identifying individual tips.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
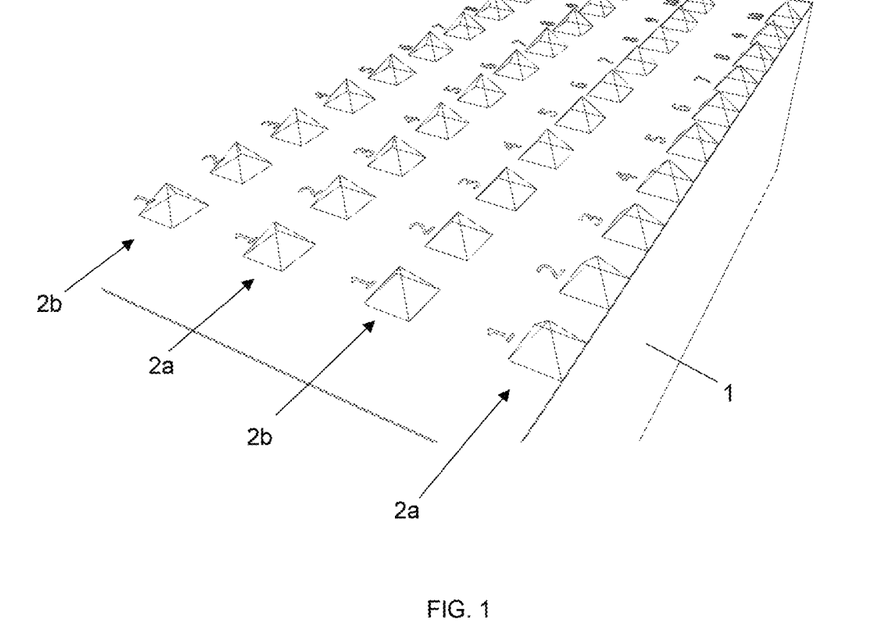
FIG. 1 shows an example of a substrate comprising different types of SPM tips, in accordance with an embodiment. The tips are shown as transparent bodies, but are in fact solid bodies.

FIG. 1 shows an example of a tip substrate 1 that is suitable for use in a method according to the disclosure. The substrate comprises two different types 2a and 2b of pyramid-shaped tips arranged in alternating rows of tips. The difference between the two types may lie in the material of the tips, or in the size and/or the sharpness of the tips, or in the presence of active or passive components associated with the tips, or in several of these characteristics combined, as will be described in more detail later in this description.

Figure 2:
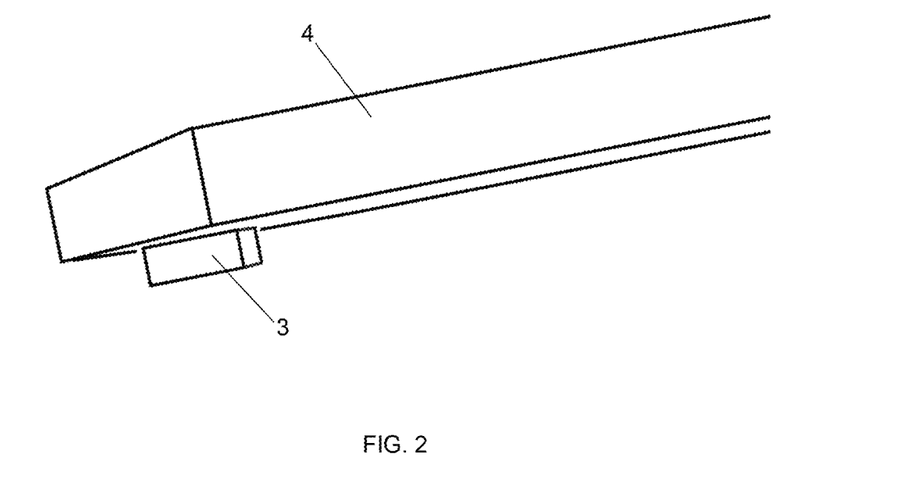
FIG. 2 illustrates a sample attached to the end of a cantilever, according to an embodiment.
Figure 3:
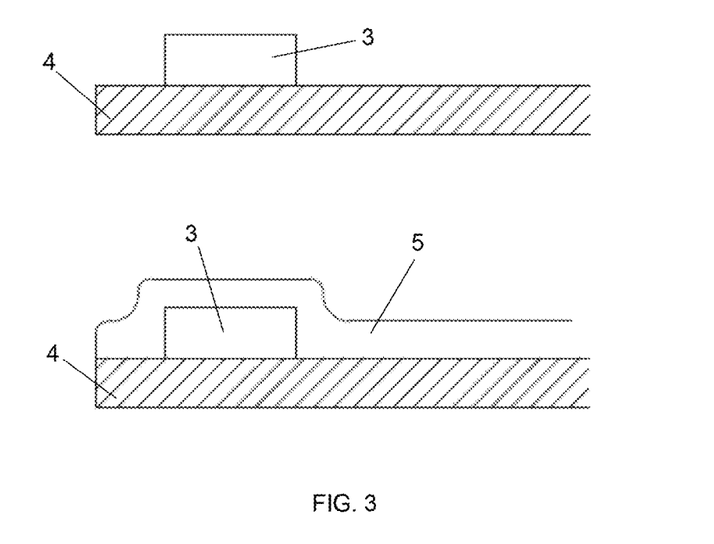
FIG. 3 illustrates a sample attached to the end of a cantilever and encapsulated by a supporting material, according to an embodiment.

An SPM measurement applied according to the disclosure uses the inverse setup, i.e., the sample is attached to the cantilever which is scanned relative to a tip. As illustrated in FIG. 2, a sample 3 is attached to the end of a cantilever 4. In the example shown, the sample 3 is a small solid volume, taken for example from a semiconductor wafer, in order to verify a number of surface and/or material characteristics of the sample. The sample 3 may be cut from the wafer by a focused ion beam (FIB) technique. It may have dimensions in the order of cubic micrometers, for example measuring 10×5×2 micrometers. The sample 3 is mounted close to the end of the cantilever 4. The sample 3 can be attached to the cantilever 4 through various techniques, such as FIB, electron-beam deposition, glue, epoxy, or mechanical clamping. According to an embodiment, and in addition to the attachment of the sample to the cantilever, the sample 3 is furthermore embedded in a supporting material 5, as illustrated in FIG. 3. The supporting material may be an epoxy of suitable viscosity so that it creeps by capillary forces between the sample 3 and the surface of the cantilever 4, while at the same time covering the sample 3. The supporting material 5 may be electrically conductive, and/or it may consist of several layers, for example a conductive layer first for electrical connection between the cantilever 4 and the sample 3 and then a non-conductive layer on top as planarization and insulating layer. The cantilever 4 is attached to a holder chip (not shown). The cantilever material, shape, and dimensions as well as the dimensions and material of the holder chip may be in accordance with known cantilevers used today for standard SPM probes, i.e. with the SPM tip mounted at the end of the cantilever.

Figure 4:
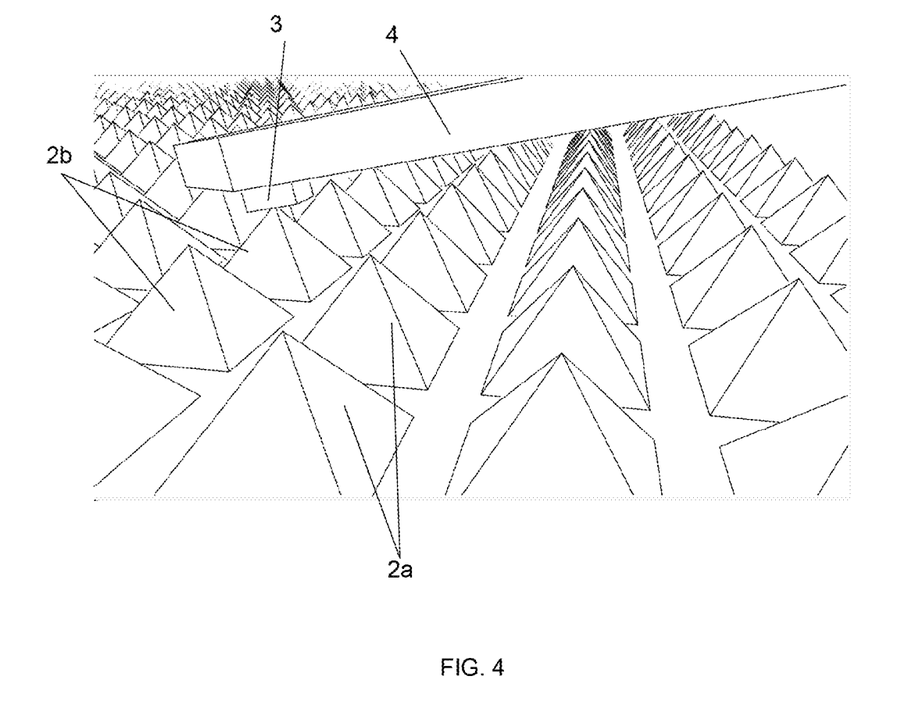
FIG. 4 illustrates how an SPM measurement may be performed, in accordance with an embodiment.

A measurement performed according to an embodiment of the method of the disclosure is illustrated in FIG. 4. The tip substrate 1 is placed on a horizontal surface and the cantilever 4 comprising the sample 3 at the end is tilted and positioned with the sample 3 facing one of the tips 2a. The sample 3 may be placed in physical contact with the tip or in close proximity with the tip but without physical contact, depending on the type of SPM measurement that is being performed. While controlling the force between the tip and the sample, the cantilever and the sample are then scanned relative to the tip, while the interaction between the sample 3 and the tip 2a is detected and processed. Any apparatus used for the standard setup can be used also in the reversed setup applied according to the disclosure. For example an AFM apparatus can be used wherein the deflections of the cantilever 4 are detected by an optical system or by measuring changes in the resonance frequency of the cantilever in the case of a 'tapping mode' AFM measurement. While the tip substrate can be placed with the tips facing upward, the tip substrate could be positioned according to another orientation, provided that the cantilever can be placed relative to the tips according to the relative position shown in FIG. 4. The scan can be realized by moving the cantilever relative to a stationary tip substrate, or by moving the tip substrate relative to a stationary cantilever or by a combination of both.

According to the disclosure, the reversed setup is used with a tip substrate 1 comprising at least two different types of tips as shown in FIG. 1. The potential advantage is that SPM measurements requiring different tip characteristics can be done without replacing the cantilever 4. For example, the tips 2a in FIG. 1 may be diamond-coated tips, while the tips 2b are magnetic tips. The substrate thereby enables performing a contact AFM or intermittent contact AFM measurement and an MFM measurement of the same sample without removing the cantilever from the measurement apparatus. Relocating the region tested in the first scan is easy when the tips 2a and 2b are arranged in regular arrays on the substrate, i.e. the distance between two tips is known accurately. According to an embodiment, illustrated also in FIG. 1, the tips on the substrate may be labelled by a number code or any other code readable by the SPM apparatus, so that a registration can be made of tips that have been used in a measurement and tips that have not yet been used.

Some embodiments may include multiple tips of each different type, so that the same SPM measurement can be repeated several times, each time with a new tip. This also allows performance of different types of SPM measurements on the same type of tip, for example a contact AFM measurement and an EFM measurement.

According to an embodiment, the substrate comprises tips 2a suitable for removing a layer of material from the sample when the sample is scanned across the tip in contact mode (a so-called 'slicing scan'), and tips 2b suitable for performing any SPM type measurement, such as AFM or SSRM on the sample after removal of the layer. This substrate enables the so-called scalpel technique without the problems of the prior art: multiple sequences of a slicing scan with one tip and an acquisition scan with another tip can be performed without removing the cantilever from the scanning apparatus. The 'slicing type' tips are different from the 'acquisition tips', the former are generally more robust and larger but less sharp than the 'acquisition type' tips.

When the sample 3 is encapsulated by a supporting material 5 as described with reference to FIG. 3, the supporting material on top of the sample 3 may be scratched away by a slicing scan as described above, before starting an actual SPM measurement on the sample itself.

According to an embodiment, the above-described scalpel technique is applied while the tips of the substrate applied in the technique are enveloped by a liquid, so that the interaction between the tips and the sample takes place in the liquid. This may be realized by providing a droplet of the liquid on the surface of the tip substrate and scanning the sample across the tip inside the droplet. The droplet envelops at least one tip used for the slicing scan, and at least one tip used for the acquisition scan. Alternatively, separate droplets envelop individual tips or groups of tips. The function of the liquid is to act as a lubricant, a coolant or a protection layer, for the sample and the tips, or as an electrical insulating layer or a surface oxidation preventing/delaying layer, or as a combination of the above. An example liquid is an oil having one or more of the above functionalities. This may be any type of organic or inorganic transformer isolation oil. The liquid can be furthermore advantageous in that it removes debris generated by the slicing step from the tips and from the sample. The liquid droplet is also a suitable target for relocating the region of interest on the sample. The liquid may be removed from the tip substrate after the measurement, by a solvent rinse and a drying step.

Figure 5A:
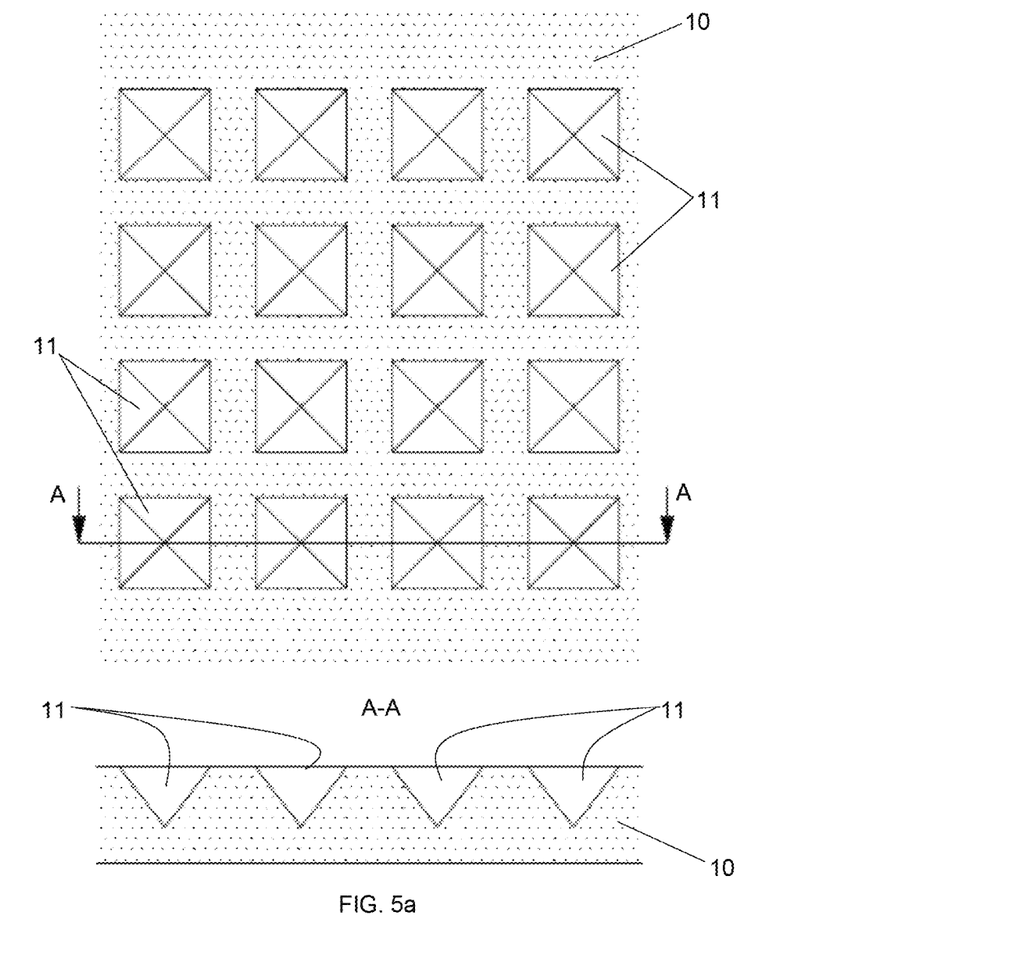
FIG. 5a illustrates a fabrication step for producing a tip substrate, according to an embodiment.
Figure 5B:
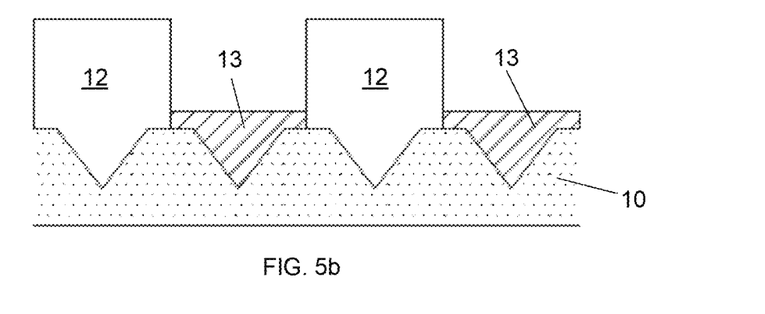
FIG. 5b illustrates a fabrication step for producing a tip substrate, according to an embodiment.
Figure 5C:
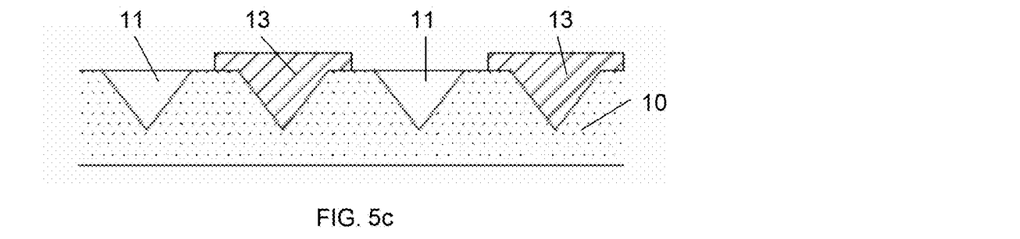
FIG. 5c illustrates a fabrication step for producing a tip substrate, according to an embodiment.
Figure 5D:
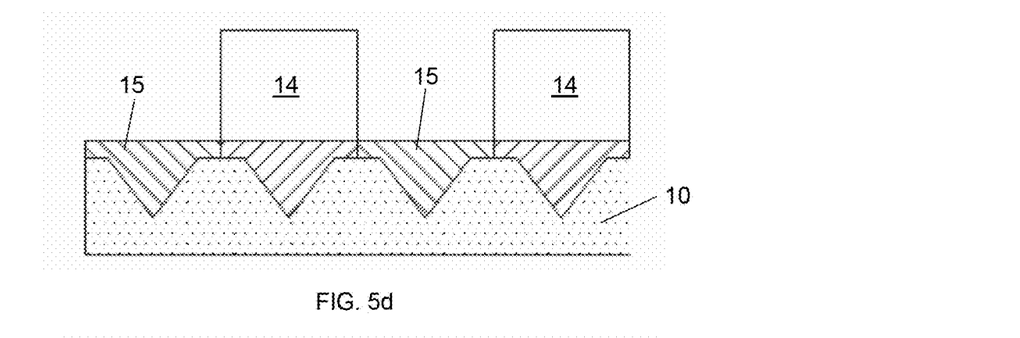
FIG. 5d illustrates a fabrication step for producing a tip substrate, according to an embodiment.
Figure 5E:
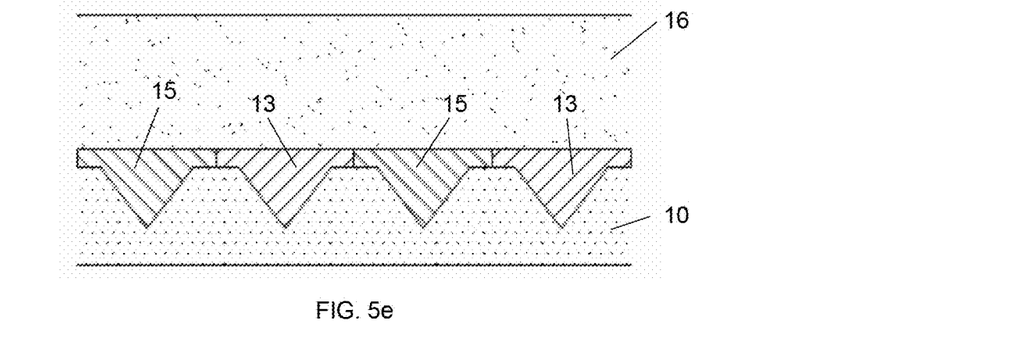
FIG. 5e illustrates a fabrication step for producing a tip substrate, according to an embodiment.
Figure 5F:
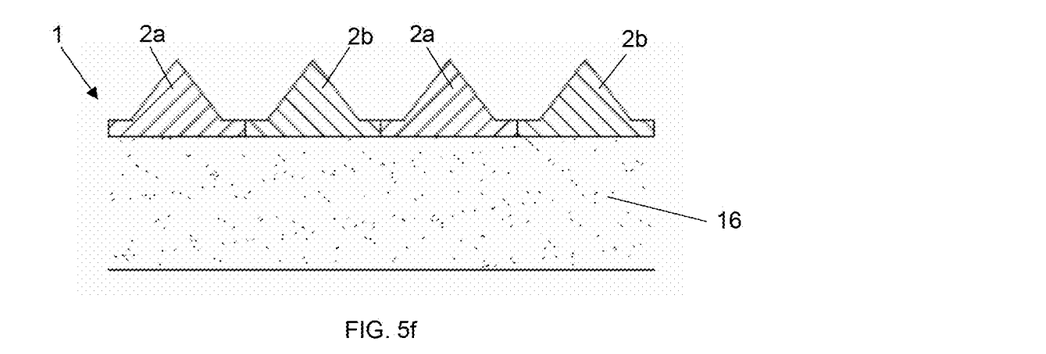
FIG. 5f illustrates a fabrication step for producing a tip substrate, according to an embodiment.

A tip substrate according to FIG. 1 can be produced by a mold technique used also for producing individual probes, but now applied for producing multiple tips on the same substrate. FIG. 5a shows a top view and a section view of a portion of a mold substrate 10 into which an array of pyramid-shaped molds 11 have been produced through wet anisotropic etching along the crystallographic planes of the substrate. This is achievable, for example, when the substrate 10 is a (100) oriented Si substrate, by wet etching the substrate in square openings while the rest of the substrate is protected by a mask. After the wet etch, the mask is stripped, resulting in the mold substrate shown in FIG. 5a. The dimensions of the molds 11 may be in the order of micrometers, for example the sides of the mold may be about 5 to 10 micrometers long and the depth of the molds may be in the same order of magnitude. As shown in FIG. 5b, one in every two rows of molds is subsequently covered by a patterned hardmask 12, and the other rows of molds are filled through the deposition of a filling material 13. This may be a diamond layer, or a sequence of layers, for example a diamond layer that lines the surfaces of the molds, followed by a metal layer or a sequence of metal layers that fills the core of the molds. The exact sequence of deposition steps and the parameters of the deposition processes may be in accordance with known techniques for producing SPM probes. After stripping the hardmask 12 (see FIG. 5c), a second hardmask 14 is deposited and patterned (FIG. 5d), covering the already filled molds and exposing the other rows of molds 11. A second deposition step is performed, filling the other molds with another material 15 than the first set of molds. For example if the first set of molds are filled with a diamond layer, the second set could be filled at least along the surfaces of the molds with a magnetic material. After stripping the second mask 14 and possibly a planarization step, a carrier substrate 16 is attached (see FIG. 5e) to the mold substrate 10, and the mold substrate itself is subsequently removed (FIG. 5f), by a combination of thinning and etching, selectively with respect to the tip materials 13 and 15. This results in the carrier substrate 16 comprising two sets of tips 2a and 2b on its surface, i.e. a tip substrate 1 according to the disclosure. The carrier substrate 16 may be a silicon substrate, attached by gluing to the mold substrate, using an epoxy as adhesive. Alternative carrier substrates are e.g. SiC, sapphire, quartz, glass, printed circuit board (PCB), or plexiglass.

Figure 6:
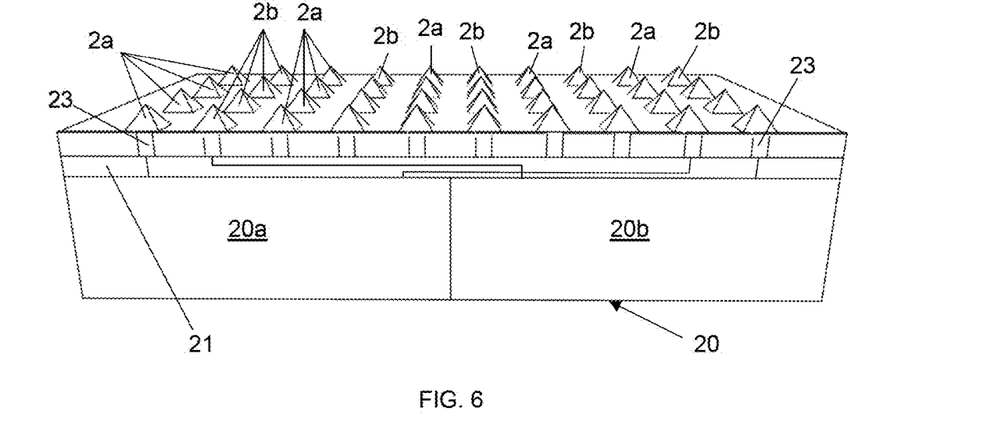
FIG. 6 illustrates a tip substrate according to an embodiment, wherein electronic components are integrated in the substrate and coupled to the tips.

According to an embodiment, some of the tips on the tip substrate are associated to one or more active or passive components mounted on or incorporated in the substrate. These could be resistors, transistors, capacitors, amplifiers, piezo-materials, magnets, lasers, mirrors, lenses, optical fibers, integrated circuits, or other types of electrical components to which the tips are connected, in case the tips themselves are formed of an electrically conductive material. FIG. 6 shows an example of a tip substrate according to this embodiment. The tip substrate comprises a carrier substrate 20 with a regular array of pyramid-shaped and electrically conductive tips on the surface, with alternate rows of tips of two different types 2a and 2b. The carrier substrate is however not a passive substrate in this case, but a semiconductor substrate or an individual chip comprising active components which are electrically connected to the tips. The carrier substrate comprises a first portion 20a comprising logarithmic amplifiers, and a second portion 20b comprising linear amplifiers. The rows of tips 2a and 2b are alternately coupled to logarithmic amplifiers and to linear amplifiers, through a redistribution layer 21 comprising routed conductors embedded in a dielectric material (well known as such in the domain of chip packaging for example). The drawing shows only four of these routed conductors in order to illustrate the routing, but the redistribution layer comprises conductors connecting every tip of the first type 2a to the first substrate portion 20a and every tip of the second type 2b to the second substrate portion 20b. Individual tips of a given type (for example 2a) may be coupled to the same or separate amplifiers within the relevant substrate portion (for example 20a in the case of type 2a) depending on the particular application. The tips as such may be all the same in this case, for example all doped diamond tips with the same dimensions and sharpness, but the two different types of tip 2a and 2b are distinguished by being coupled to two different micro-electronic components. Of course, the tips 2a and 2b may be distinguished also by additional differences in terms of their material and shape.

The particular substrate shown in FIG. 6 is useful for performing SSRM on a sample attached to a cantilever, which typically uses a logarithmic amplification, i.e. using a tip 2a, and c-AFM (contact AFM) measurement on the same sample, which requires a linear amplification, i.e. using a tip 2b. The embodiment can be advantageous as it enables performing these two different SPM measurements on the same sample and in a single SPM tool, without removing the cantilever from the SPM tool. Another potential advantage is the fact that the amplifiers are placed in close proximity to the tips, which can be beneficial in terms of the signal to noise ratio compared to the standard non-reversed SPM setup, where the tip on the cantilever is connected to an amplifier through a wire of a given length. The substrate of FIG. 6 further comprises contact terminals (not shown) for powering and accessing the output of the amplifiers. The terminals may be present on the same surface of the tips, and connected to the amplifiers through the redistribution layer 21, or on the back surface of the substrate, and connected to the amplifiers through via connections.

The substrate of FIG. 6 may be produced in a similar way to the method described above with reference to FIGS. 5a to 5f. The mold substrate is processed in accordance with FIGS. 5a to 5d, or alternatively, all the molds 11 are filled simultaneously, to produce the same tips on the entire mold substrate. The carrier substrate 20 is processed according to known semiconductor processing techniques: the carrier then comprises a front end of line portion with the amplifiers integrated therein, and a back end of line portion comprising conductors which connect the amplifiers to connection pads on the surface of the carrier. The redistribution layer 21 is then processed on the carrier and the carrier including the redistribution layer is bonded to the mold substrate, after which the mold substrate is removed, leaving only the tips (as in FIG. 5f). The conductors 23 shown in FIG. 6 may be processed on the mold substrate prior to bonding, or they may be part of the redistribution layer 21. The redistribution layer 21 including the conductors 23 could be processed on the mold substrate instead of on the carrier 20.

Instead of the redistribution layer 21, the mold substrate could be attached to a carrier comprising active electrical components via a conductive epoxy layer. This may be applied when no individual routing from the tips to the active components is required.

The components need not be electrical components. For example, they could comprise liquid channels for liquid dispense and/or pickup, which can for example be used to perform the scalpel technique in oil, described above. The oil can be transported from a reservoir tank via channels incorporated in the substrate to locations close to the tips where it is released through an opening in a controlled manner to form a droplet that envelops one or more tips. The channels may also be used to dispense a liquid and perform 'liquid cell AFM'.

As stated above, a measurement according to the disclosure may use existing SPM tools, for example an existing AFM apparatus wherein normally a sample is placed on a holding table and a cantilever with a tip attached to it is scanned across the sample. According to the method of the disclosure, the substrate tip is placed on the holding table, and the cantilever having the sample attached to it is scanned across multiple tips to perform multiple AFM measurements, for example using tips of different size and sharpness. One problem with this approach is that for most SPM measurements, the cantilever is held in a tilted position, as illustrated in FIG. 4. In many cases, the tilt angle is determined by the measurement setup, for example a tilt angle of about 10-12° with respect to the direction of the holding table is commonly applied in order to allow a probe to scan across large substrates without touching it with parts of the probe. However, when the sample is attached to the cantilever and not to the holding table, the sample itself is tilted at 10-12° and when it is sliding over the tip, the scanning head typically needs to adjust the applied force to maintain the required/requested contact force. As part of this force is also acting in the scanning direction, the tip can slip slightly forward (force increase) or backward (force reduction). For lower-resolution images (e.g. scanning with 256 pixels at $1\times1$ $\mu m^2 = \sim 4$ nm per pixel), this slipping effect is generally not noticed in the images. For higher-resolution images (e.g. scanning with $\geq 512$ pixels at $1\times1$ $\mu m^2 = \sim 2$ nm per pixel) however, this effect can be often noticed in the images as if there is a small double-tip present. The visibility of this artefact depends also on the actual tip sharpness.

Figure 7A:
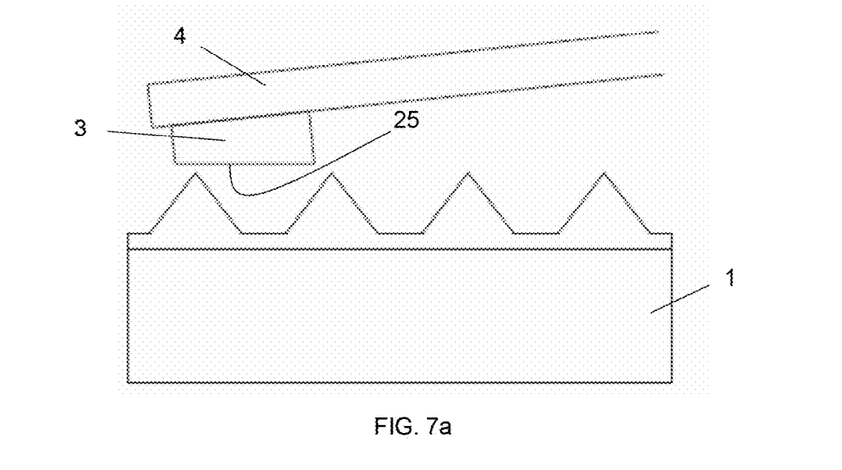
FIG. 7a illustrates an embodiment wherein the cantilever is provided with a tilted surface to make it compatible with existing SPM tools.
Figure 7B:
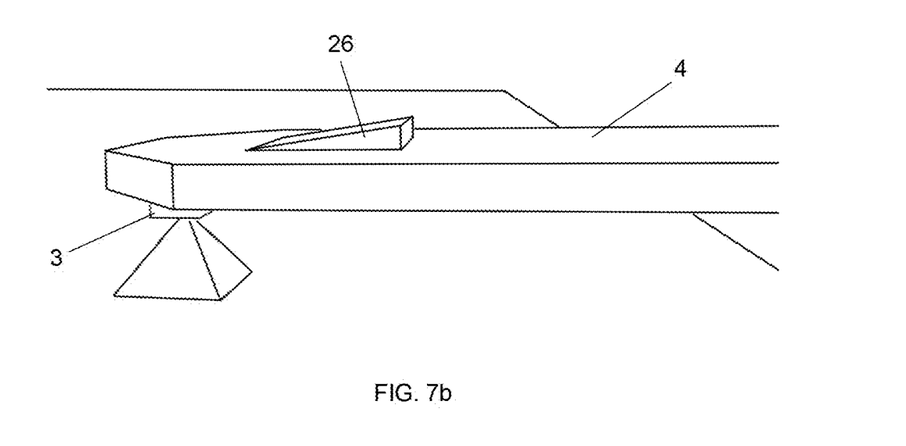
FIG. 7b illustrates an embodiment wherein the cantilever is provided with a tilted surface to make it compatible with existing SPM tools.
Figure 7C:
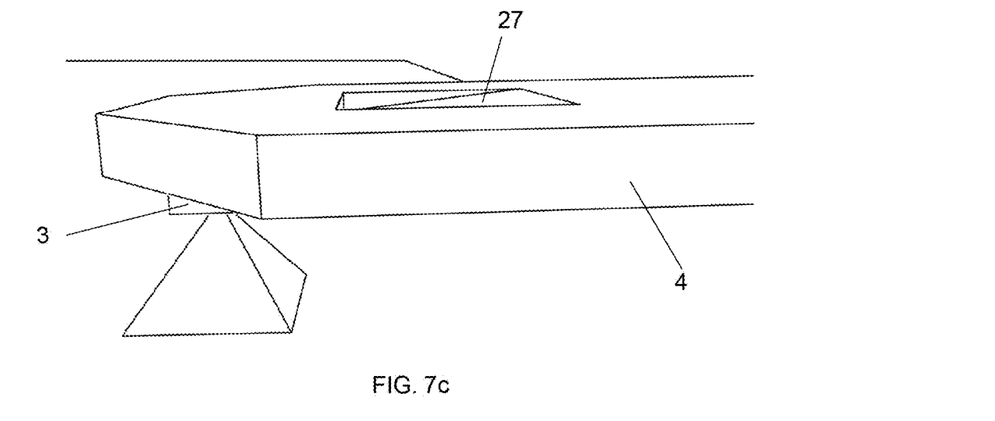
FIG. 7c illustrates an embodiment wherein the cantilever is provided with a tilted surface to make it compatible with existing SPM tools.
Figure 7D:
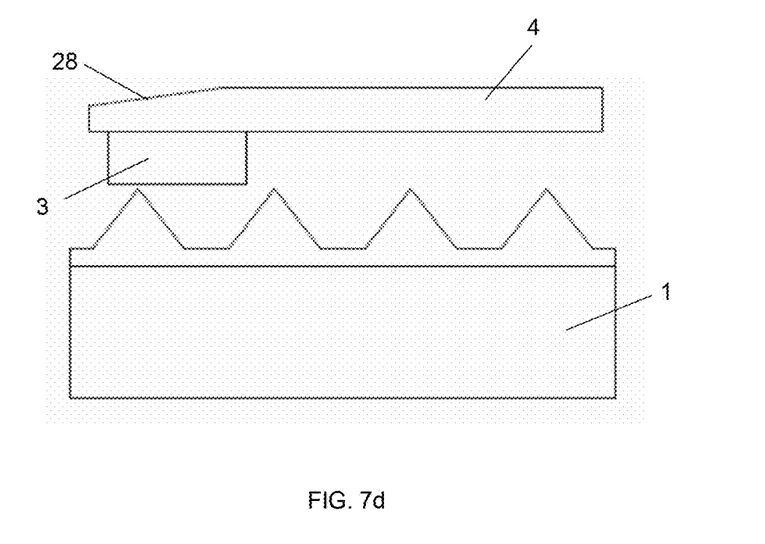
FIG. 7d illustrates an embodiment wherein the cantilever is provided with a tilted surface to make it compatible with existing SPM tools.

A number of potential solutions to this problem may be applied in accordance with different embodiments of the disclosure. FIG. 7a shows a sample 3 that is shaped so that its contact surface 25 is parallel to the tip substrate 1. FIG. 7b shows a cantilever provided with an elevated portion 26 having a slanted surface, inclined at the desire angle. FIG. 7c shows a cantilever having a cavity 27 with the bottom of the cavity being inclined at the desired angle. FIG. 7d shows a cantilever 4 of which the upper surface 28 is shaped at the end of the cantilever according to the desired angle. The embodiments of FIGS. 7b to 7d allow the scan to be performed while the cantilever 4 is maintained parallel to the tip substrate 1, or at a smaller tilting angle than perhaps required by the apparatus.

According to an embodiment of the method of the disclosure, a holder is used to which multiple cantilevers are attached, thereby allowing the measurement of multiple samples. According to another embodiment, more than one sample, for example two samples are attached side by side to the same cantilever.

The cantilever may have an opening at the location of the sample. This opening may be for example a hole in the cantilever or a U-shaped cantilever end. Such a cantilever with an opening may be used for example for the inspection of thin TEM (transmission electron microscopy) specimens, attached to the hole in the cantilever or to the U-shaped opening in the manner of TEM specimen holders known as such in the art.

The tips 2a and 2b on the tip substrate are not limited to the four-sided pyramids described above. For example, (311) Si wafers can be used for creating three-sided pyramidal structures by the same molding technique described above. (110) Si or 45° oriented (100) Si can be used to create pillar-like structures by the same molding technique.

Figure 8:
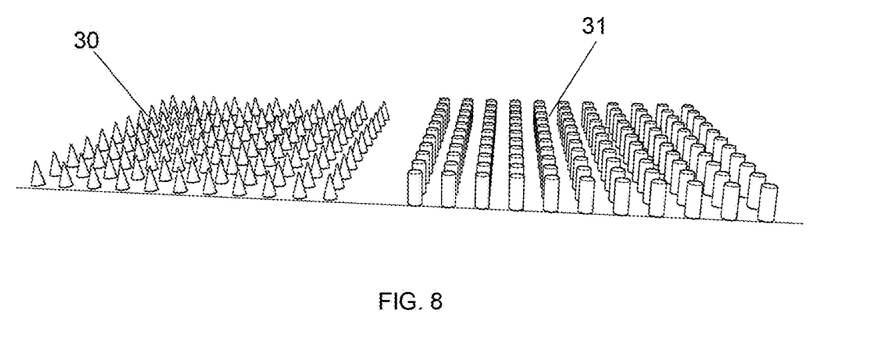
FIG. 8 illustrates a tip substrate comprising pillar-shaped and cone-shaped tips, according to an embodiment.

Also, the tips may be produced in the form of nano-cones 30 or nanowires 31, as illustrated in FIG. 8. These can be produced by the molding technique described above, but wherein the molds are shaped as inverted nano-cones or nanowires. These molds are obtainable by producing a hardmask on the mold substrate that exposes a regular array of round openings on the surface of the mold substrate, and etching the exposed material of the mold substrate by a dry (plasma) etch process. Alternatively, a blanket diamond layer or a layer of other suitable tip material (e.g. metal, silicon, silicon nitride, or silicon oxide) of for example 1 micrometer thickness may be deposited on a flat silicon wafer (i.e. without molds), and subsequently bonded to a carrier wafer 16 as described above, after which the silicon wafer is removed (also as described above), resulting in the carrier wafer with a smooth diamond layer on its surface. The diamond layer is then patterned by first producing a lithographic mask on the diamond layer, the mask being formed of nano-sized circular mask portions at regular distances. A dry etch process, for example a plasma etch using $O_2$ as the plasma gas, thins or removes the diamond around the circular areas, thereby creating a regular array of nano-cones or nanowires. The circular mask portions will in the end be consumed by the etch process, but much slower than the diamond layer, hence the formation of cones or wires. The shape of the resulting diamond tips is a cone for shorter etch times and becomes more pillar-shaped as the etch time is longer, due to the slight isotropy of the oxygen-based plasma etch. In order to produce cones and pillars on the same substrate, or cones of two different sizes, the above-described dry etch process may be performed twice, with each time one part of the diamond layer protected by a hardmask that is resistant to the plasma etch.

The method of the disclosure may be applied in a semiconductor production environment, to perform multiple SPM measurements during various stages of the production process, by cutting out test samples from a wafer. According to an embodiment, the test samples are produced in dedicated areas of the wafer, for example in dicing lane areas, with a cantilever layer on top of the sample and attached thereto, after which the cantilever layer is patterned to form individual cantilevers on the samples, which may be removed from the wafer by an under-etch and peel-off technique, as known for the production of SPM probes, and described for example in U.S. Pat. No. 6,756,584. In this way, samples are removed from the wafer without using a cutting technique like FIB, which may generate contaminants during semiconductor processing.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method for performing a scanning probe microscopy (SPM) measurement on a sample, the method comprising:
    attaching the sample to a cantilever;
    providing a substrate comprising on a surface of the substrate a first SPM tip and second SPM tip that differ from each other in material composition, shape, or size;
    performing a first SPM measurement by scanning the sample across the first SPM tip, wherein performing the first SPM measurement comprises slicing away a layer of the sample using the first SPM tip; and
    performing a second SPM measurement by scanning the sample across the second SPM tip after performing the first SPM measurement.

2. The method according to claim 1, wherein the first SPM tip and the second SPM tip differ from each other in material composition.

3. The method according to claim 1, wherein the first SPM tip and the second SPM tip differ from each other in shape.

4. The method according to claim 1, wherein the first SPM tip and the second SPM tip differ from each other in size.

5. The method according to claim 1, wherein the first SPM tip is electrically coupled to an electronic component mounted on or incorporated in the substrate.

6. The method according to claim 1, wherein performing the first SPM measurement comprises performing the first SPM measurement as the cantilever is held parallel to the surface of the substrate.

7. The method according to claim 1, wherein performing the first SPM measurement comprises performing the first SPM measurement as the cantilever is held at an angle relative to the substrate.

8. The method according to claim 1, wherein performing the first SPM measurement comprises performing the first SPM measurement such that a surface of the sample is essentially parallel to the substrate.

9. The method according to claim 1, wherein performing the first SPM measurement comprises performing the first SPM measurement such that a first surface of the cantilever is opposite the sample and tilted at a first angle with respect to the sample and a second surface of the cantilever facing the sample is parallel to or at a second angle with respect to the sample, the second angle being different from the first angle.

10. The method according to claim 1, wherein performing the first SPM measurement comprises performing the first SPM measurement while the first SPM tip is enveloped by a liquid.

11. The method according to claim 1, wherein performing the second SPM measurement comprises performing the second SPM measurement while the second SPM tip is enveloped by a liquid.

12. The method according to claim 1, wherein performing the first SPM measurement comprises performing the first SPM measurement while the sample is encapsulated by a supporting material.

13. A substrate comprising on its surface a first scanning probe microscopy (SPM) tip and a second SPM tip that differs from the first SPM tip in material composition, shape, or size, wherein the first SPM tip is configured for slicing away a layer of a sample and wherein the second SPM tip is configured for scanning the sample across the second SPM tip after slicing away the layer of the sample.

* * * * *